United States Patent
Evans et al.

(10) Patent No.: US 6,648,083 B2
(45) Date of Patent: Nov. 18, 2003

(54) METHOD AND APPARATUS FOR MEASURING MUD AND FORMATION PROPERTIES DOWNHOLE

(75) Inventors: Michael Evans, Missouri City, TX (US); Richard J Radtke, Pearland, TX (US); W Robert Sloan, Missouri City, TX (US); Robert A Adolph, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 41 days.

(21) Appl. No.: 10/040,701

(22) Filed: Oct. 26, 2001

(65) Prior Publication Data

US 2002/0096363 A1 Jul. 25, 2002

Related U.S. Application Data

(60) Provisional application No. 60/245,335, filed on Nov. 2, 2000.

(51) Int. Cl.$^7$ ................................................ E21B 49/00
(52) U.S. Cl. ........................ 175/41; 250/254; 250/269.4; 73/152.04
(58) Field of Search ................................. 250/254, 258, 250/261, 268, 265, 266; 175/40, 41, 45, 50; 33/302, 304, 306; 73/152.03, 152.04, 152.19, 152.43, 152.46

(56) References Cited

U.S. PATENT DOCUMENTS

| | | |
|---|---|---|
| 3,688,115 A | 8/1972 | Antkiw |
| 4,412,130 A | 10/1983 | Winters |
| 4,479,564 A | 10/1984 | Tanguy |
| 4,492,865 A | 1/1985 | Murphy et al. |
| 4,637,479 A | 1/1987 | Leising |
| 4,698,501 A | 10/1987 | Paske |
| 4,879,463 A | 11/1989 | Wraight et al. |
| 5,017,778 A | 5/1991 | Wraight |
| 5,144,126 A | 9/1992 | Perry et al. |
| 5,237,540 A | 8/1993 | Malone |
| 5,469,736 A | 11/1995 | Moake |
| 5,473,158 A | 12/1995 | Holenka et al. |
| 5,513,528 A * | 5/1996 | Holenka et al. ......... 73/152.03 |
| 5,767,510 A | 6/1998 | Evans |
| 6,032,102 A | 2/2000 | Wijeyesekera et al. |
| 6,176,323 B1 | 1/2001 | Weirich et al. |
| 6,285,026 B1 * | 9/2001 | Evans et al. ................ 250/265 |

* cited by examiner

*Primary Examiner*—David Bagnell
*Assistant Examiner*—Matthew J Smith
(74) *Attorney, Agent, or Firm*—Victor H. Segura; Brigitte L. Jeffery; John Ryberg

(57) ABSTRACT

A method is disclosed for determining a characteristic of a mud mixture surrounding a drilling tool within a borehole in which a drilling tool is received. The method includes turning the tool in the borehole. Energy is applied into the borehole from an energy source disposed in the tool. Measurement signals are received at a sensor disposed in the tool from a location around the borehole. The cross-section of the borehole is separated into at least a first sector and a second sector. A first measurement signal from the first sector is substantially in response to returning energy which results from the interaction of the applied energy with the mud mixture. A second measurement signal from the second sector is substantially in response to returning energy which results from the interaction of the applied energy with the formation. An indication of an intrinsic characteristic of the mud mixture is derived from the first measurement signals associated with the first sector of the borehole.

41 Claims, 7 Drawing Sheets

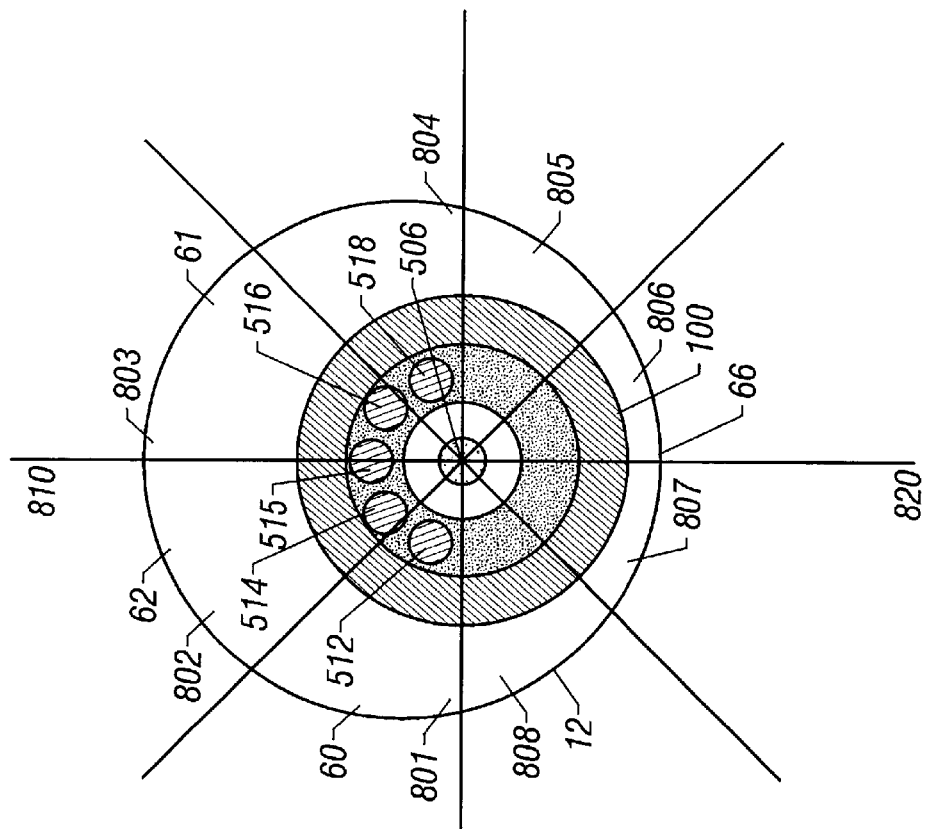
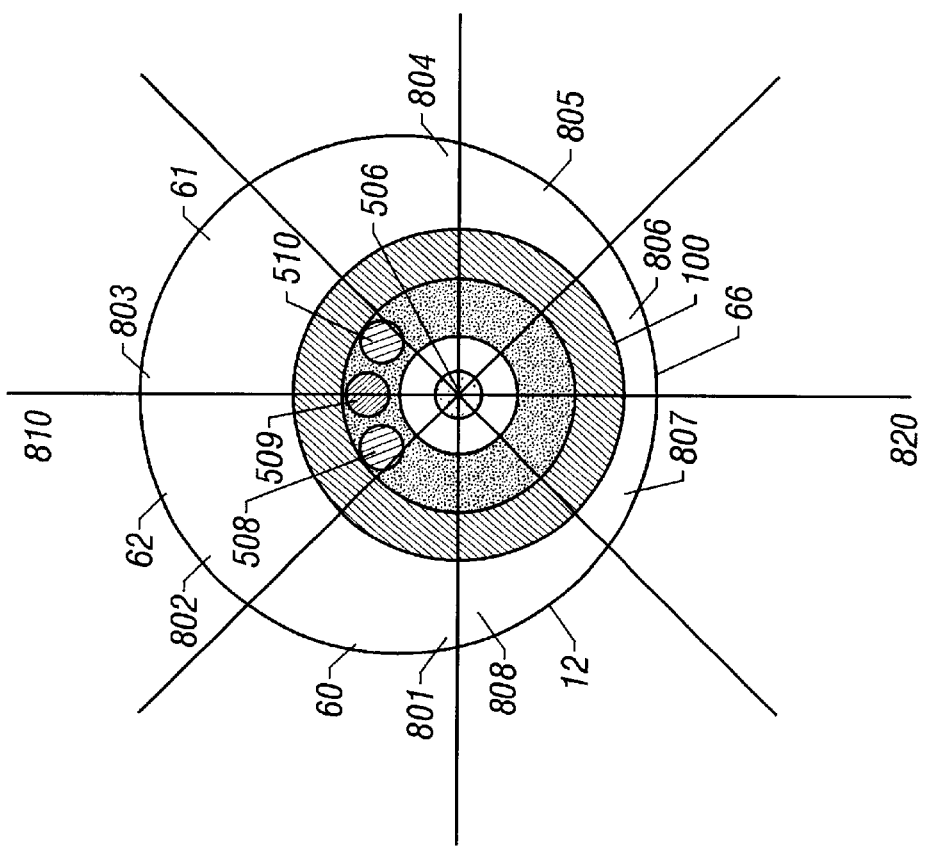

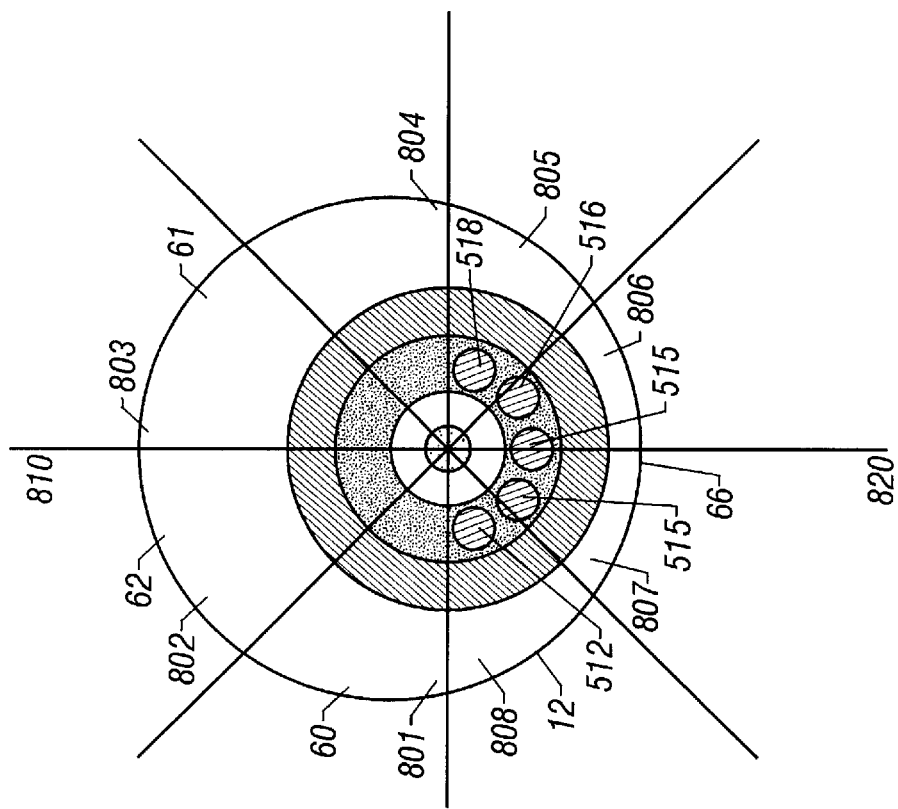
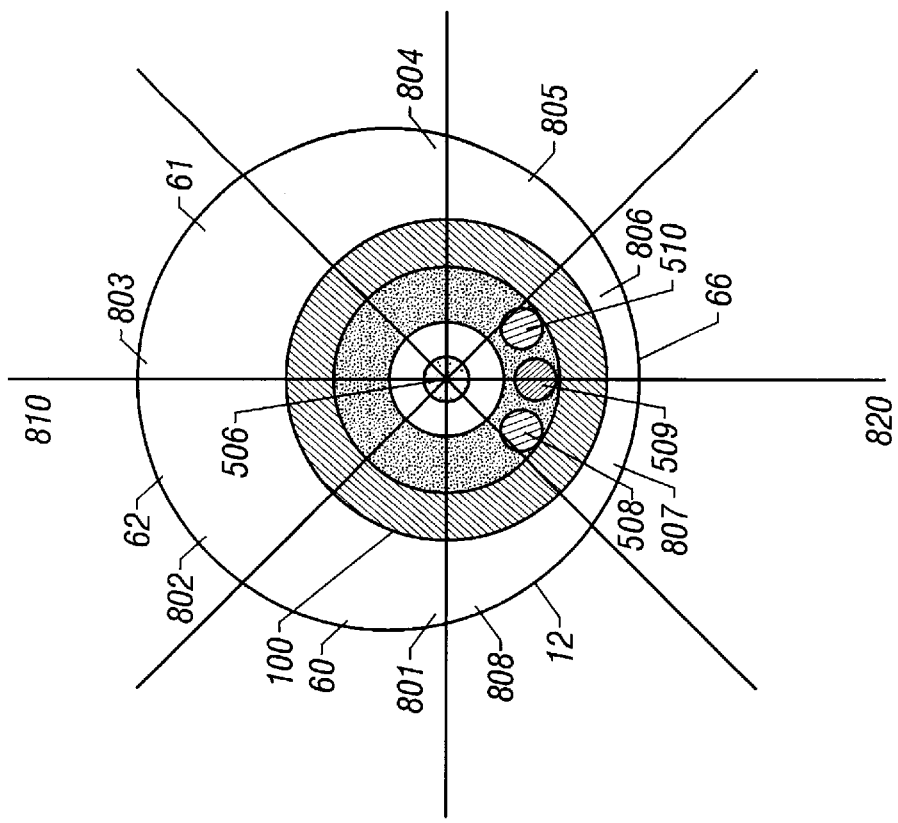
FIG. 5B
FIG. 5A

METHOD AND APPARATUS FOR MEASURING MUD AND FORMATION PROPERTIES DOWNHOLE

CROSS-REFERENCE TO RELATED APPLICATIONS

This application claims priority from U.S. Provisional Application No. 60/245,335 filed on Nov. 2, 2000.

BACKGROUND OF INVENTION

1. Field of the Invention

The invention relates generally to exploration and production, and more particularly, to a method and apparatus for monitoring the properties of the borehole fluid.

2. Description of Related Art

The characteristics of geological formations are of significant interest in the exploration for and production of subsurface mineral deposits, such as oil and gas. Many characteristics, such as the hydrocarbon volume, porosity, lithology, and permeability of a formation, may be deduced from certain measurable quantities. Among these quantities are the density, neutron porosity, photoelectric factor, hydrogen index, salinity, and thermal neutron capture cross section (sigma). The quantities are typically measured by logging-while-drilling ("LWD") and wireline tools. The tool carries one or more sources that radiate energy into the formation and detectors that sense the result of the radiation. These detectors either transmit the data back uphole or temporarily store it downhole. Typically, once uphole, the data is input to one or more formation evaluation models, which are typically software programs used to evaluate the geological formation from which the data was gathered.

In addition to the formation, the fluids in the borehole are also of interest, both intrinsically and for their effect on the measurements directed at formation evaluation. Currently, the borehole fluid ("drilling mud" or "mud") is typically characterized at the surface and its properties are extrapolated to conditions downhole. Factors such as temperature, pressure, and mud composition can vary in both space and time along the borehole. In addition, new mud formulations are continually evolving in the industry.

U.S. Pat. No. 3,688,115, issued to Antkiw, discloses a fluid density measuring device for use in producing oil wells. Density is determined by forcing the well fluid to pass through a chamber in the device. The fluid attenuates a beam of gamma radiation that traverses the chamber, the relative changes in the beam intensity providing a measure of the density in question.

U.S. Pat. No. 4,412,130, issued to Winters, discloses an apparatus for use within a well for indicating the difference in densities between two well fluids. The apparatus, for use with measurement-while-drilling (MWD) systems, is formed within a drill collar with a source of radiation removably disposed in a wall of the drill collar. At least two radiation detectors are located equidistant from the source of radiation with one detector adjacent an interior central bore through the drill collar and a second detector is adjacent the exterior of the drill collar. Two fluid sample chambers are spaced between the source of radiation and the detectors, respectively; one chamber for diverting fluid from the bore and the other chamber for diverting fluid from the annular space between the drill bore and the drill collar. Suitable circuitry is connected to the detectors for producing a differential signal substantially proportional to the difference in radiation received at the two detectors. The difference in the density between fluid passing through the drill collar and returning through the annular space is detected and indicated by the apparatus for early detection and prevention of blowouts.

U.S. Pat. No. 4,492,865, issued to Murphy et al., discloses a system for detecting changes in drilling fluid density downhole during a drilling operation that includes a radiation source and detector which are arranged in the outer wall of a drill string sub to measure the density of drilling fluids passing between the source and detector. Radiation counts detected downhole are transmitted to the surface by telemetry methods or recorded downhole, where such counts are analyzed to determine the occurrence of fluid influx into the drilling fluid from earth formations. Changes in the density of the mud downhole may indicate the influx of formation fluids into the borehole. Such changes in influx are determinative of formation parameters including surpressures which may lead to the encountering of gas kicks in the borehole. Gas kicks may potentially result in blowouts, which of course are to be avoided if possible. Hydrocarbon shows may also be indicative of producible formation fluids. The radiation source and detector in one embodiment of the system are arranged in the wall of the drill string sub to provide a direct in-line transmission of gamma rays through the drilling fluid.

U.S. Pat. No. 4,698,501, issued to Paske et al., discloses a system for logging subterranean formations for the determination of formation density by using gamma radiation. Gamma ray source and detection means are disposed within a housing adapted for positioning within a borehole for the emission and detection of gamma rays propagating through earth formations and borehole drilling fluid. The gamma ray detection means comprises first and second gamma radiation sensors geometrically disposed within the housing the same longitudinal distance from the gamma ray source and diametrically opposed in a common plane. A formation matrix density output signal is produced in proportion to the output signal from each of the gamma ray sensors and in conjunction with certain constants established by the geometrical configuration of the sensors relative to the gamma ray source and the borehole diameter. Formation density is determined without regard to the radial position of the logging probe within the borehole in a measuring while drilling mode.

U.S. Pat. No. 5,144,126, issued to Perry et al., discloses an apparatus for nuclear logging. Nuclear detectors and electronic components are all mounted in chambers within the sub wall with covers being removably attached to the chambers. A single bus for delivering both power and signals extends through the sub wall between either end of the tool. This bus terminates at a modular ring connector positioned on each tool end. This tool construction (including sub wall mounted sensors and electronics, single power and signal bus, and ring connectors) is also well suited for other formation evaluation tools used in measurement-while-drilling applications.

U.S. Pat. No. 5,469,736, issued to Moake., discloses a caliper apparatus and a method for measuring the diameter of a borehole, and the standoff of a drilling tool from the walls of a borehole during a drilling operation. The apparatus includes three or more sensors, such as acoustic transducers arranged circumferentially around a downhole tool or drill collar. The transducers transmit ultrasonic signals to the borehole wall through the drilling fluid surrounding the drillstring and receive reflected signals back from the wall. Travel times for these signals are used to calculate standoff data for each transducer. The standoff measurements may be used to calculate the diameter of the borehole, the eccentricity of the tool in the borehole, and the angle of eccentricity with respect to the transducer position. The eccentricity and angle computations may be used to detect unusual movements of the drillstring in the borehole, such as sticking, banging, and whirling.

U.S. Pat. No. 5,473,158, issued to Holenka et al., discloses a method and apparatus for measuring formation characteristics as a function of angular distance sectors about the borehole. The measurement apparatus includes a logging while drilling tool which turns in the borehole while drilling. Such characteristics as bulk density, photoelectric effect (PEF), neutron porosity and ultrasonic standoff are all measured as a function of such angular distance sectors where one of such sectors is defined to include that portion of a "down" or earth's gravity vector which is in a radial cross sectional plane of the tool. The measurement is accomplished with either a generally cylindrical tool which generally touches a down or bottom portion of the borehole while the tool rotates in an inclined borehole or with a tool centered by stabilizer blades in the borehole.

U.S. Pat. No. 6,032,102, issued to Wijeyesekera et al., discloses a method and an apparatus for determining the porosity of a geological formation surrounding a cased well. The method further comprises generating neutron pulses that irradiate an area adjacent the well, where neutrons are sensed at a plurality of detectors axially spaced apart from each other and a plurality of neutron detector count rates is acquired. A timing measurement is acquired at one of the spacings to measure a first depth of investigation. A ratio of the neutron detector count rates is acquired to measure a second depth of investigation. An apparent porosity is calculated using the timing measurements and the ratios of neutron count rates. The effect of a well casing on the calculated apparent porosity is determined in response to at least one of the ratio of neutron detector count rates and the timing measurement. A cement annulus is computed based on the ratios of neutron count rates and the timing measurement. A formation porosity is calculated by performing a correction to the apparent porosity for the casing and the cement annulus.

U.S. Pat. No. 6,176,323, issued to Weirich et al., discloses a drilling system for drilling oilfield boreholes or wellbores utilizing a drill string having a drilling assembly conveyed downhole by a tubing (usually a drill pipe or coiled tubing). The drilling assembly includes a bottom hole assembly (BHA) and a drill bit. The bottom hole assembly preferably contains commonly used measurement-while-drilling sensors. The drill string also contains a variety of sensors for determining downhole various properties of the drilling fluid. Sensors are provided to determine density, viscosity, flow rate, clarity, compressibility, pressure and temperature of the drilling fluid at one or more downhole locations. Chemical detection sensors for detecting the presence of gas (methane) and $H_2S$ are disposed in the drilling assembly. Sensors for determining fluid density, viscosity, pH, solid content, fluid clarity, fluid compressibility, and a spectroscopy sensor are also disposed in the BHA. Data from such sensors is processed downhole and/or at the surface. Corrective actions are taken at the surface based upon the downhole measurements, which may require altering the drilling fluid composition, altering the drilling fluid pump rate or shutting down the operation to clean the wellbore. The drilling system contains one or more models, which may be stored in memory downhole or at the surface. These models are utilized by the downhole processor and the surface computer to determine desired fluid parameters for continued drilling. The drilling system is dynamic, in that the downhole fluid sensor data is utilized to update models and algorithms during drilling of the wellbore and the updated models are then utilized for continued drilling operations.

There remains a need for a technique to measure the properties of the formation and borehole fluid downhole. As applied to LWD, such a technique preferably takes advantage of the tool's rotation while drilling to scan the formation/mud environment.

SUMMARY OF INVENTION

A method is disclosed for determining a characteristic of a mud mixture surrounding a drilling tool within a borehole in which a drilling tool is received. The method includes turning the tool in the borehole. Energy is applied into the borehole from an energy source disposed in the tool. Measurement signals are received at a sensor disposed in the tool from a location around the borehole. The cross-section of the borehole is separated into at least a first sector and a second sector. A first measurement signal from the first sector is substantially in response to returning energy which results from the interaction of the applied energy with the mud mixture. A second measurement signal from the second sector is substantially in response to returning energy which results from the interaction of the applied energy with the formation. An indication of an intrinsic characteristic of the mud mixture is derived from the first measurement signals associated with the first sector of the borehole.

Other aspects and advantages of the invention will be apparent from the following description and the appended claims.

BRIEF DESCRIPTION OF DRAWINGS

The invention may be understood by reference to the following description taken in conjunction with the accompanying drawings, in which like reference numerals identify like elements, and in which:

FIG. 4A illustrates a sectional view of a tool in a borehole with near detectors pointing into the mud;

FIG. 4B illustrates a sectional view of a tool in a borehole with far detectors pointing into the mud;

FIG. 5A illustrates a sectional view of a tool in a borehole with near detectors pointing into the formation;

FIG. 5B illustrates a sectional view of a tool in a borehole with far detectors pointing into the formation;

DETAILED DESCRIPTION OF SPECIFIC EMBODIMENTS

Generally speaking, embodiments of a method according to the invention rely on the fact that a well logging instrument, including logging while drilling instruments, tend to rest on the bottom of an inclined (non vertical) wellbore due to earth's gravity. Because the diameter of the wellbore is typically much greater than the diameter of the well logging instrument, there is typically a substantial gap between the upper wall of the wellbore and the exterior of the logging instrument. Selected types of well logging sensors have a response which is azimuthally directional, primarily because of the placement of the sensors and accompanying energy source(s). Some of these sensors have a radial or lateral depth of investigation which is sufficiently small so that when the sensors are oriented toward the upper wall of the wellbore, the sensor response is primarily related to the properties of drilling mud filling the space between the instrument and the wellbore wall. When the same sensors are oriented toward the bottom of the wellbore, their response is primarily related to the properties of the earth formations adjacent the wellbore. The directional nature of response of these sensors can be used in various embodiments of the invention to determine properties of the mud in the wellbore, by using sensor measurements made when the sensors are oriented toward the upper wall of the wellbore. As will be further explained herein, instruments known in the art can be used to determine the gravitational orientation of the sensors.

To summarize some methods according to the invention, a gravitational orientation of sensors in a well logging instrument is determined in a wellbore. The wellbore is azimuthally divided into at least two sectors, one of which includes the bottom of the wellbore. The other sector does not include the bottom of the wellbore. As a logging while drilling instrument is rotated within the wellbore, the energy source(s) emit energy which interacts with the drilling mud and the formations. Detector response is recorded with respect to rotational orientation. A property of the drilling mud is determined from the sensor response in the sector not including the bottom of the wellbore. A property of the earth formation may be determined from sensor response in the sector which includes the bottom of the wellbore. The numbers of and angular sizes of each sector maybe selected to suit the particular type of sensor.

Figure 1:
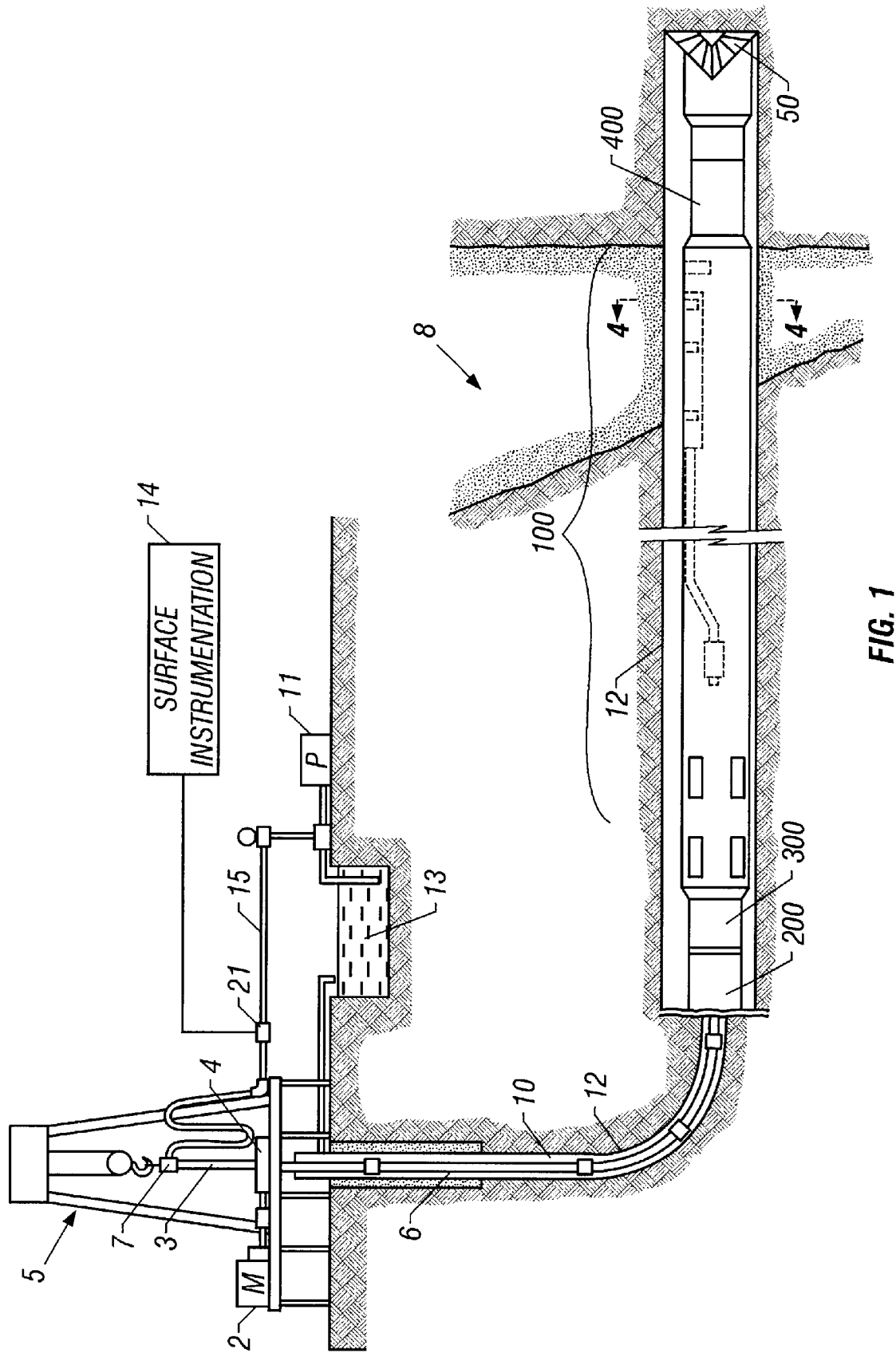
FIG. 1 is a schematic illustration of a downhole logging while drilling (LWD) tool connected in tandem with other measuring while drilling (MWD) tools above a drill bit at the end of a drill string of an oil and gas well in a section of the well which is substantially horizontal.

FIG. 1 illustrates a logging while drilling (LWD) tool 100 connected in tandem with a drilling assembly including a drill bit 50. An associated downhole electronics module 300 and MWD tool 200, including magnetometers and accelerometers therein, are also connected in tandem with LWD tool 100. Module 300 may be a separate "sub" or it may be disposed in the body of LWD tool 100. A communication sub 400 may also be provided as illustrated in the drilling assembly.

The LWD tool 100 is shown for illustration purposes as being in an inclined portion of a borehole at the end of a drill string 6 which turns in a borehole 12 which is formed in formation 8 by penetration of bit 50. A drilling rig 5 turns drill string 6. Drilling rig 5 includes a motor 2 which turns a kelly 3 by means of a rotary table 4. The drill string 6 includes sections of drill pipe connected end-to-end to the kelly 3 and turned thereby. The MWD tool 200, electronics module 300, and the LWD tool 100 and communication sub 400 are all connected in tandem with drill string 6. Such subs and tools form a bottom hole drilling assembly between the drill string 6 of drill pipe and the drill bit 50.

As the drill string 6 and the bottom hole assembly turn, the drill bit 50 forms the borehole 12 through earth formations 8. In one embodiment, drilling fluid or "mud" is forced by pump 11 from mud pit 13 via stand pipe 15 and revolving injector head 7 through the hollow center of kelly 3 and drill string 6, and the bottom hole drilling assembly to the bit 50. Such mud acts to lubricate drill bit 50 and to carry borehole cuttings or chips upwardly to the surface via annulus 10. In another embodiment, drilling fluid or "mud" is forced by pump 11 from mud pit 13 via stand pipe 15 and revolving injector head 7 through the annulus 10 to the bit 50, the mud returns through the bit 50, the bottom hole drilling assembly, through the drill string 6, and to the hollow center of kelly 3. The mud is returned to mud pit 13 where it is separated from borehole cuttings and the like, degassed, and returned for application again to the drill string 6.

The communication sub 400 may receive output signals from sensors of the LWD tool 100 and from computers in the downhole electronics module 300 and MWD tool 200. Such communications sub 400 is designed to transmit coded acoustic signals representative of such output signals to the surface through the mud path in the drill string 6 and downhole drilling assembly. Such acoustic signals are sensed by transducer 21 in standpipe 15, where such acoustic signals are detected in surface instrumentation 14. The communication sub 400, including the surface instrumentation necessary to communicate with it, may be arranged as the downhole and surface apparatus disclosed in U.S. Pat. No. 4,479,564 and U.S. Pat. No. 4,637,479. The communication sub 400 may include the communication apparatus disclosed in U.S. Pat. No. 5,237,540.

Figure 2:
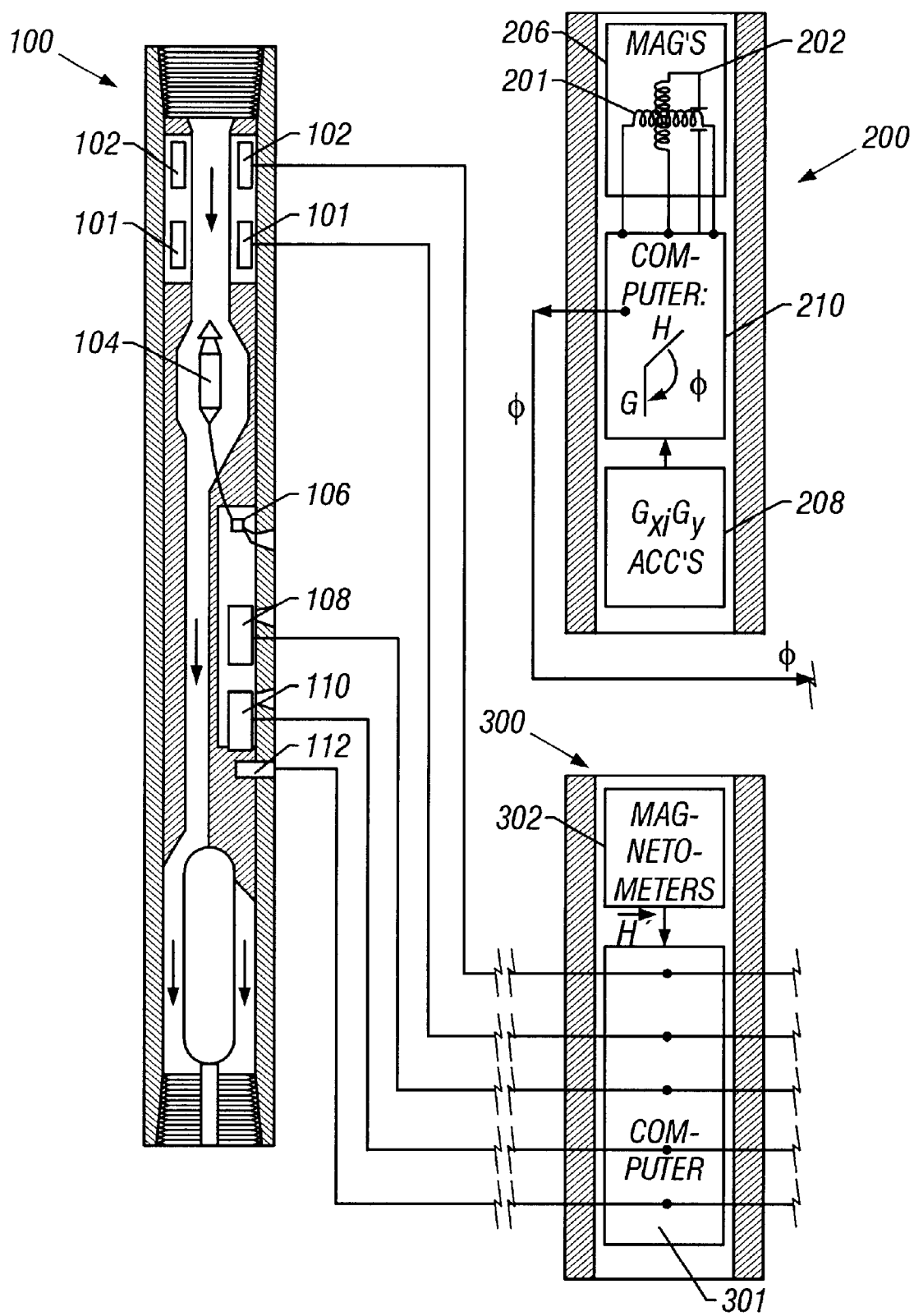
FIG. 2 is a schematic longitudinal cross section of the LWD tool which can be used in a method according to the invention, illustrating a neutron source and neutron detectors, a gamma ray source and gamma ray detectors and an ultrasonic detector, producing mud or formation neutron data, mud or formation gamma ray data and ultrasonic signal data, respectively.

Logging While Drilling (LWD) Tool:

FIG. 2 is a schematic view of the LWD tool 100. The physical structure of the LWD tool body and associated sensors may be like those described in U.S. Pat. No. 4,879,463 to Wraight, et al., U.S. Pat. No. 5,017,778 to Wraight, and U.S. Pat. No. 5,473,158 to Holenka, et al. Those patents describe a logging while drilling tool, specifically a compensated density neutron tool used in logging while drilling measurements of formation characteristics. Other optional equipment of the LWD tool 100 may include: (1) an ultrasonic sensor 112 that is added to the assembly and (2) stabilizer blades. The addition of one or more stabilizer blades (not shown) is an alternative embodiment of the LWD tool 100 as shown in FIG. 4B, where a tool is offset from the borehole wall, but not centered in the borehole and used with methods of the invention as described below.

The LWD tool 100 may include a source of neutrons 104, and near and/or far spaced neutron detectors 101, 102 at axially spaced locations from the source 104. It may also include a source of gamma rays 106 and short and/or long spaced gamma ray detectors 108, 110. LWD tool 100 may also include an ultrasonic transducer 112 for measuring tool standoff from the borehole wall. An ultrasonic transducer and system is described in U.S. Pat. No. 5,130,950 issued to Orban, et al.

In one embodiment, the number of sources (neutron, gamma ray, and/or ultrasonic) may be varied according the operating environment. In an alternative embodiment, the LWD tool 100 need not necessarily be mounted to drill string 6 and might simply be lowered into the wellbore 12 during a cessation in drilling activities. In one embodiment, there is provided a single source and a single detector on the LWD tool 100, so that measurements of different parts of the borehole can be made after the tool is raised, lowered, turned, and/or rotated. In another embodiment, there is provided a plurality of source—detector sets on the LWD tool 100, so that measurements of different parts of the borehole can be made after the tool is raised, lowered, turned, and/or rotated. In another embodiment, the LWD tool 100 may carry a plurality of each type of detector arranged azimuthally about the LWD tool 100, so that the LWD tool 100 might not need to be rotated in order to make measurements of different parts of the borehole. In another embodiment, there are provided multiple, separate tools (not shown), each carrying only one type of source with appropriate detectors, might be deployed instead of a single LWD tool 100 carrying all of the sources and receivers.

In another embodiment, the LWD tool 100 has a placement of detectors and the ability to determine tool orientation, such that measurements of count rates, spectra, and tool angle with respect to gravity and/or vertical, for example, can be obtained which can be analyzed to yield mud and formation properties. In another embodiment, a wireline (WL) or LWD tool is provided that makes at least one measurement with a depth of investigation comparable to or smaller than the difference between the nominal borehole diameter and the outer diameter of the tool. This measurement may also be focused azimuthally, for example to within at most about 180 degrees. In another embodiment the tool may be run off center within the borehole and have a known orientation, determined either by measuring its orientation dynamically or by other means known in the art, for example on the bottom of the borehole, or rotated slightly up from the bottom in either direction. The rotation up from the bottom could be caused by friction between the tool and the borehole as the tool is rotated In one embodiment, the LWD tool 100 can make a shallow, focused measurement collected when the spatial region to which the measurement is sensitive largely overlaps the mud crescent. (The mud crescent 62 is so named because of the crescent shaped annulus that is formed in the wellbore 12 due to the LWD tool's 100 offset location.) This measurement is mainly correlated with the mud properties. In another embodiment, data may be collected when the sensitive region largely overlaps the formation and would be mainly correlated with the formation properties. In another embodiment, the LWD tool 100 may make both kinds of measurements. The data collected from these measurements may be obtained simultaneously from different detectors or sequentially by changing the orientation of the tool deliberately or as a by-product of rotation. The tool may make additional measurements that are not necessarily shallow or focused. The data from all measurements may then be combined with knowledge of the tool response to yield accurately the properties of both mud and the formation. Properties of the mud or the formation that may be measured include density, photoelectric factor, hydrogen index, salinity, neutron porosity, and thermal neutron capture cross-section(sigma).

In one embodiment, the LWD tool 100 is an Azimuthal Density Neutron Tool, for example Vision 825 ADN (Trademark of Schlumberger) tool. This tool is a slick-collar nuclear LWD tool generally used in deviated boreholes drilled with large bits. Neutrons are produced from a centrally mounted chemical AmBe source and diffuse into the surrounding mud and formation. Some fraction of these neutrons return and are detected in one or both of two banks, distinguished by their distances to the source along the tool axis ("near" and "far") and by the detector configurations in each bank. The near bank comprises two unshielded $^3$He detectors which are mainly sensitive to thermal neutrons. These detectors flank a $^3$He detector shielded with cadmium, rendering it sensitive primarily to epithermal neutrons. The far bank comprises five unshielded $^3$He thermal neutron detectors. The three central far detectors may be coaxial with the three near detectors. Other materials may be used for shielding one or more of the detectors as known in the art. In another embodiment, the shielding may be omitted under certain source-detector spacings and configurations. Neutron data collected when the tool is in the up and down sectors may be used to determine the hydrogen index and salinity of the mud and the neutron porosity and salinity of the formation. The Vision 825 ADN tool 100 also contains a gamma ray section, which generally consists of a gamma ray source and two gamma ray detectors close to (short-spaced detector) and farther from (long-spaced detector) the source. The depth of investigation of the corresponding measurement is shallow compared to the depth of the mud crescent and is even more focused than the neutron measurement. Gamma-ray data collected when the tool is in the up and down sectors may be used to determine density and photoelectric factor of both formation and mud. In another embodiment, the techniques of using the LWD tool 100 allow for the economical use of a single set of detectors to measure both mud and formation properties.

MWD Tool:

A MWD tool 200 may be provided in the bottom halo drilling assembly as schematically indicated in FIG. 1. As shown in FIG. 2, the MWD tool 200 also includes a magnetometer section 206, with magnetometers 201, 202 oriented along x and y axes of the tool. Such x and y axes are in the plane of a radial cross section of the tool. A z axis of the tool is oriented along its longitudinal axis. In a similar way, accelerometers $G_x$ and $G_y$ of accelerometer package 208 (which also includes an accelerometer along the z axis of the tool) are oriented along the x and y axes of the tool. A microcomputer 210 responds to $H_y$ and $H_x$ signals and $G_x$ and $G_y$ signals to constantly determine angle $\Phi$ between vectors in the cross sectional plane of MWD tool 200. The electronics module 300 also includes a magnetometer section 302 and a microcomputer 301.

In one embodiment, the borehole is divided into two sectors. In one embodiment, die borehole is divided into four sectors. In another embodiment, the borehole is divided into eight sectors. In another embodiment, the borehole is divided into sixteen sectors. In another embodiment, a single sector can be divided into two or more sub-sectors. In another embodiment, two or more sectors can be combined into one super-sector.

In one embodiment, the tool 100 is off-center in the borehole, so that one measurement is concentrated on the mud and another measurement is concentrated on the formation.

In one embodiment, a method includes first determining a gravity vector as is known in the art. Next, a bottom angular sector, called SECTOR BOTTOM, of the borehole is defined. This sector includes the gravity vector therein.

With the ultrasonic sensor 112, the BOTTOM STAND-OFF (amount of tool separation from the bottom of the wellbore) maybe made from ultrasonic measurements while the tool is in the bottom sector. Next, a neutron porosity, density, and/or photoelectric effect may be determined as a function of the near neutron count rate and the far neutron count rate measured in the bottom sector and corrected by the BOTTOM STANDOFF determined above.

The procedure described above may be repeated respectively for the other sectors. Determination of Mud Properties:

Referring to FIGS. 3 to 7, in another embodiment, a "mud measurement" (measurement in which most or all of the sensor response is related to interaction between emitted energy and the mud) may be made when the tool rotates such that the tool acquires data in the uppermost (top) sector 810. Due to their proximity to the source 506, the depth of investigation of the near detectors 508, 509, 510 may be on the order of 2 inches. This distance is less than the approximately 4 inch gap between the tool surface and the top of the borehole. In one embodiment, any combination of souce and detector that can make shallow and reasonably focused measurements may be used to make measurements. The body of the tool behind the near detector bank 508, 509, 510 also restricts the sensitivity of these detectors to the side of the tool on which they reside. The combination of these effects yields a sufficiently shallow and focused response to enable a mud measurement. While the tool is rotated such that the detectors are in the top sector 810, the near detectors 508, 509, 510 respond mainly to the mud. In particular, the count rate of the near epithermal detector in the top sector 810 is sensitive to the relative concentration of hydrogen in the mud (the mud hydrogen index), and the ratio of the count rate in this detector to the total count rate in the near thermal detectors corresponds mainly to the salinity of the mud.

In another embodiment, while the detectors (508, 509, 510, 512, 514, 515, 516, and/or 518 in FIGS. 5A and 5B) of the tool 100 are in the bottom sector 820, most response comes from the formation. In particular, the count rate of the near epithermal detector in the bottom sector 820 is sensitive to the relative concentration of hydrogen in the formation (the formation hydrogen index), and the ratio of the count rate in this detector to the total count rate in the near thermal detectors corresponds mainly to the salinity of the formation. By recording sector-based count rates, the separate mud- and formation-derived responses are preserved. In another embodiment, these measurements may complement the standard neutron porosity measurement derived from the ratio of the total near thermal detector count rate to the total far detector count rate in the bottom sector 820. In contrast to the near detectors, the far detector depth of investigation is too deep to respond mainly to borehole or formation effects but is sensitive to both. Taking the near/far ratio reduces but does not eliminate this borehole dependence. In one embodiment, the mud measurements are inverted and/or compensated for by the formation measurements, and the formation measurements are inverted and/or compensated for by the mud measurements, i.e. when interested in the mud properties correct for the formation measurements, or when interested in the formation properties correct for the mud measurements.

Figure 3:
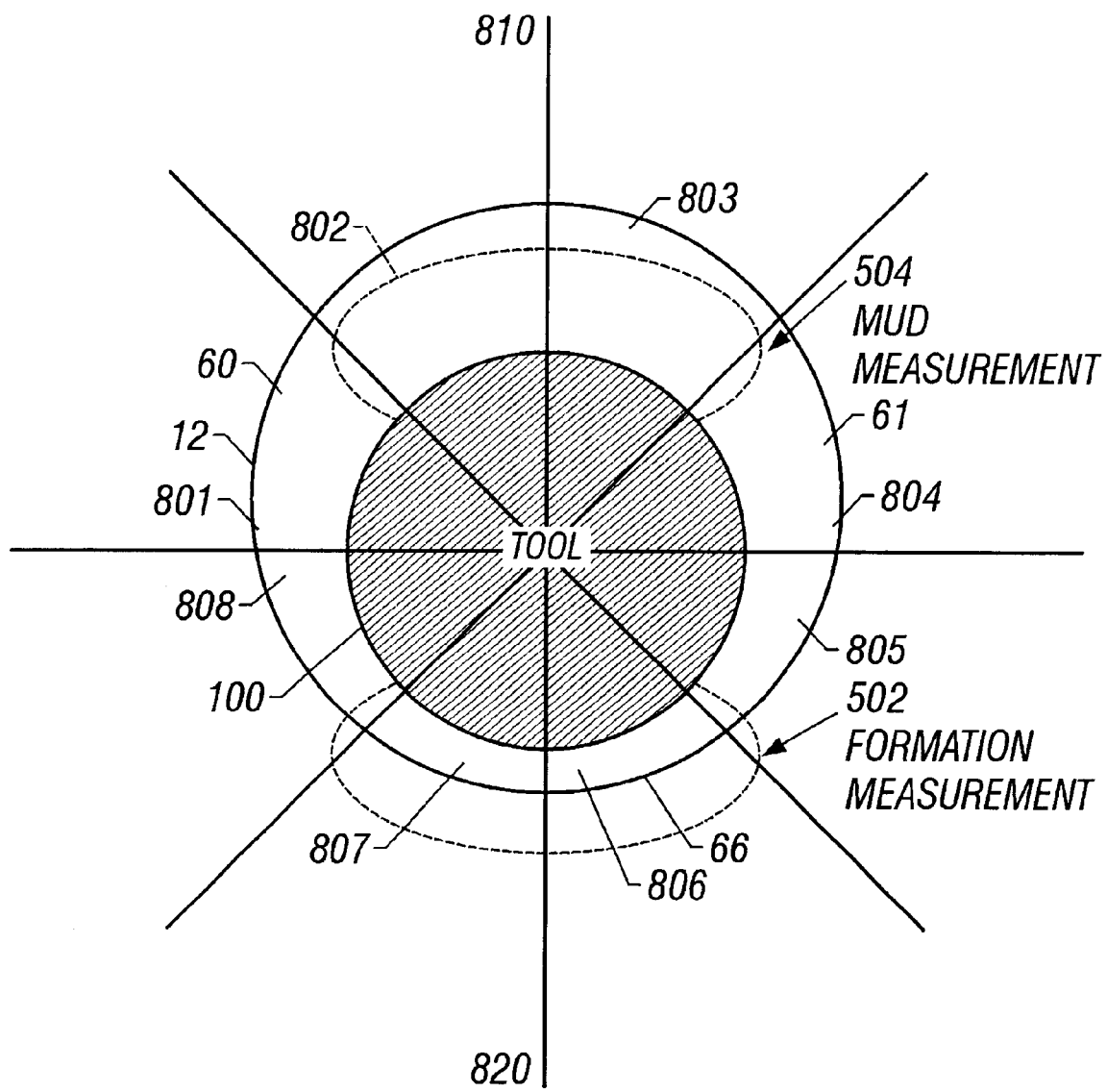
FIG. 3 illustrates a sectional view of a tool in a borehole with mud.

FIG. 3 represents one illustration which can be identified using an embodiment of the invention, where the tool 100 is in a borehole 12, near the bottom side 66 of the borehole 12, and/or off-center in the borehole, due to gravity. The annulus 60 is the crescent-shaped area of the borehole 12 that is not occupied by the tool 100. The annulus 60 of the borehole 12 is occupied by the mud 61. The borehole is divided into two sectors, a top sector 810 and a bottom sector 820. The top sector 810 has been subdivided into four subsectors 801, 802, 803, and 804. The bottom sector 820 has been subdivided into four subsectors 805, 806, 807, and 808. The tool can make a first measurement, a formation measurement 502, when pointing down and/or pointing into the bottom sector 820, and a second measurement, a mud measurement 504, when pointing up and/or pointing into the top sector 810. A selected set of the top sectors are used for the mud measurement, while a selected set of bottom sectors are used for the formation measurement.

FIG. 4A represents another embodiment of the invention where the tool 100 is in a borehole 12, near the bottom side 66 of the borehole 12, and/or off-center in the borehole. Typically, the tool 100 will tend towards the bottom side 66 due to gravity (in a deviated borehole). The annulus 60 is the mud crescent 62 or the crescent-shaped area of the borehole 12 that is not occupied by the tool 100. The annulus 60 of the borehole 12 is occupied by the mud 61. In this embodiment, the tool 100 has a source 506 (below the plane of the figure), a first near detector 508, a second near detector 510, and a third near detector 509. In one embodiment, the first near detector 508 and the second near detector 510 are thermal neutron detectors, and the third near detector 509 is an epithermal neutron detector. The borehole is divided into two sectors, a top sector 810 and a bottom sector 820. The top sector 810 has been subdivided into four subsectors 801, 802, 803, and 804. The bottom sector 820 has been subdivided into four subsectors 805, 806, 807, and 808. In this embodiment, the first near detector 508, the second near detector 510, and the third near detector 509 mostly detect the mud properties since the detectors are in the top sector 810. In a first embodiment, the source 506 produces neutrons, and the detectors 508, 509, and/or 510 detect the returning neutrons after the neutrons have been reflected by the formation (not shown) and/or the mud 61.

FIG. 4B represents another embodiment of the invention where the tool 100 is in a borehole 12, near the bottom side 66 of the borehole 12, and/or off-center in the borehole. Typically, the tool 100 will tend towards the bottom side 66 due to gravity (in a deviated borehole). The annulus 60 is the mud crescent 62 or the crescent-shaped area of the borehole 12 that is not occupied by the tool 100. The annulus 60 of the borehole 12 is occupied by the mud 61. In this embodiment, the tool 100 has a source 506, a first far detector 512, a second far detector 514, a third far detector 516, a fourth far detector 518, and a fifth far detector 515. The first far detector 512, the second far detector 514, the third far detector 516, the fourth far detector 518, and the fifth far detector 515 may be azimuthally distributed around the tool 100. In one embodiment, the first far detector 512, the second far detector 514, the third far detector 516, the fourth far detector 518, and the fifth far detector 515 are thermal neutron detectors. The borehole is divided into two sectors, a top sector 810 and a bottom sector 820. The top sector 810 has been subdivided into four subsectors 801, 802, 803, and 804. The bottom sector 820 has been subdivided into four subsectors 805, 806, 807, and 808. In this embodiment, the source 506 (below the plane of the figure), the first far detector 512, the second far detector 514, the third far detector 516, the fourth far detector 518, and the fifth far detector 515 mostly detect the mud properties since the detectors are in the top sector 810. In a first embodiment, the source 506 produces neutrons, and the detectors 512, 514, 515, 516, and/or 518 detect the returning neutrons after the neutrons have interacted with the formation (not shown) and/or the mud 61. In another embodiment, there are a plurality of detectors (not shown) azimuthally distributed around the tool 100, with this embodiment it is possible to make azimuthal measurements about the borehole without having to rotate the tool 100.

FIG. 5A represents another embodiment of the invention where the tool 100 is in a borehole 12, near the bottom side 66 of the borehole 12, and/or off-center in the borehole. Typically, the tool 100 will tend towards the bottom side 66 due to gravity (in a deviated borehole). The annulus 60 is the mud crescent 62 or the crescent-shaped area of the borehole 12 that is not occupied by the tool 100. The annulus 60 of the borehole 12 is occupied by the mud 61. In this embodiment, the tool 100 has a source 506, a first near detector 508, a second near detector 510, and a third near detector 509. In one embodiment, the first near detector 508 and the second near detector 510 are thermal neutron detectors, and the third near detector 509 is an epithermal neutron detector. The borehole is divided into two sectors, a top sector 810 and a bottom sector 820. The top sector 810 has been subdivided into four subsectors 801, 802, 803, and 804. The bottom sector 820 has been subdivided into four subsectors 805, 806, 807, and 808. In this embodiment, the first near detector 508, the second near detector 510, and the third near detector 509 mostly detect the formation properties since the detectors are in the bottom sector 820. In a first embodiment, the source 506 produces neutrons, and the detectors 508, 509, and/or 510 detect the returning neutrons after the neutrons have returned from the formation (not shown) and/or the mud 61. In a second embodiment, the source 506 produces gamma rays, and the detectors 508, 509, and/or 510 detect the returning gamma rays after the gamma rays have been returned by the formation (not shown) and/or the mud 61. In a third embodiment, the source 506 produces acoustic waves, and the detectors 508, 509, and/or 510 detect the returning acoustic waves after the acoustic waves have been reflected by the formation (not shown) and/or the mud 61. In a fourth embodiment, the source 506 produces neutrons, and the detectors 508, 509, and/or 510 detect the returning gamma rays after the neutrons excite the formation (not shown) and/or the mud 61 to produce gamma rays. In another embodiment, the tool 100 may be rotated to measure properties in one or more other sectors.

FIG. 5B represents another embodiment of the invention where the tool 100 is in a borehole 12, near the bottom side 66 of the borehole 12, and/or off-center in the borehole. Typically, the tool 100 will migrate towards the bottom side 66 due to gravity (in a deviated borehole). The annulus 60 is the mud crescent 62 or the crescent-shaped area of the borehole 12 that is not occupied by the tool 100. The annulus 60 of the borehole 12 is occupied by the mud 61. In this embodiment, the tool 100 has a source 506, a first far detector 512, a second far detector 514, a third far detector 516, a fourth far detector 518, and a fifth far detector 515. The first far detector 512, the second far detector 514, the third far detector 516, the fourth far detector 518, and the fifth far detector 515 may be azimuthally distributed around the tool 100. In one embodiment, the first far detector 512, the second far detector 514, the third far detector 516, and the fourth far detector 518, and the fifth far detector 515 are thermal neutron detectors. The borehole is divided into two sectors, a top sector 810 and a bottom sector 820. The top sector 810 has been subdivided into four subsectors 801, 802, 803, and 804. The bottom sector 820 has been subdivided into four subsectors 805, 806, 807, and 808. In this embodiment, the source 506 (below the plane of the figure), the first far detector 512, the second far detector 514, the third far detector 516, the fourth far detector 518, and the fifth far detector 515 mostly detect the formation properties since the detectors are in the bottom sector 820. In a first embodiment, the source 506 produces neutrons, and the detectors 512, 514, 515, 516, and/or 518 detect the returning neutrons after the neutrons have interacted with the formation (not shown) and/or the mud 61. In another embodiment, there are a plurality of detectors (not shown) azimuthally distributed around the tool 100, with this embodiment it may be possible to make azimuthal measurements about the borehole without having to rotate the tool 100.

Figure 6A:
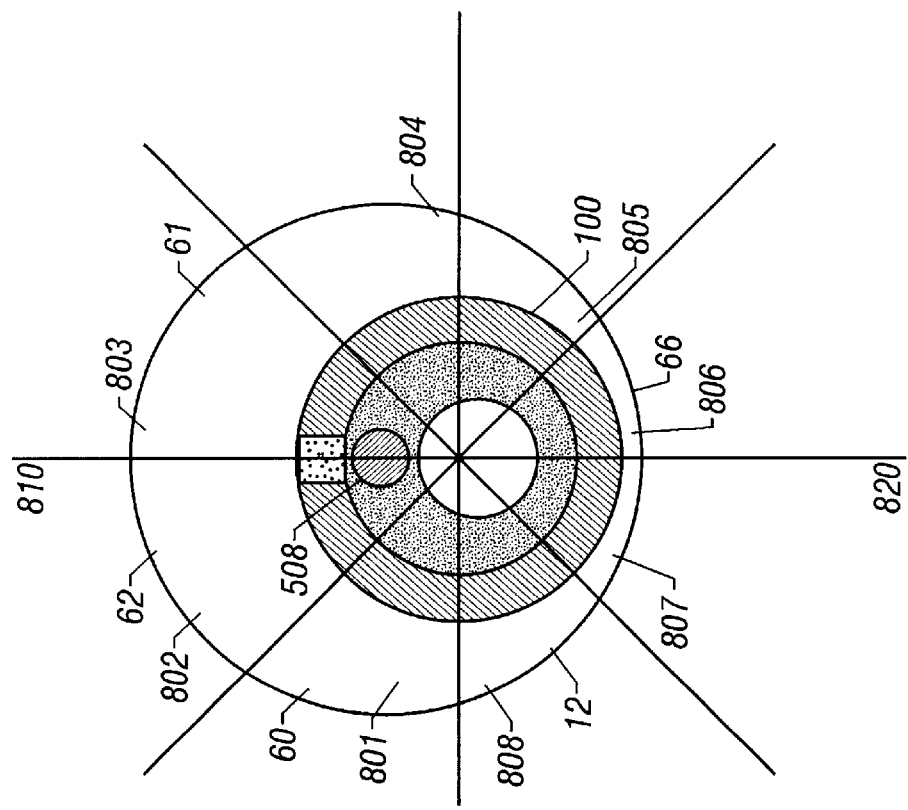
FIG. 6A illustrates a sectional view of a tool in a borehole with the detector pointing into the formation.

FIG. 6A represents another embodiment of the invention where the tool 100 is in a borehole 12, near the bottom side 66 of the borehole 12, and/or off-center in the borehole. Typically, the tool 100 will migrate towards the bottom side 66 due to gravity (in a deviated borehole). The annulus 60 is the mud crescent 62 or the crescent-shaped area of the borehole 12 that is not occupied by the tool 100. The annulus 60 of the borehole 12 is occupied by the mud 61. The area around the source and detectors may include shielding as is known in the art. The borehole is divided into two sectors, a top sector 810 and a bottom sector 820. The top sector 810 has been subdivided into four subsectors 801, 802, 803, and 804. The bottom sector 820 has been subdivided into four subsectors 805, 806, 807, and 808. In this embodiment, the detector 508 mostly detects the formation properties since the detector is in the bottom sector 820. In a first embodiment, the source (not shown) produces neutrons, and the detector 508 detects the returning neutrons after the neutrons have been reflected by the formation (not shown) and/or the mud 61. In a second embodiment, the source 506 produces gamma rays, and the detector 508 detects the returning gamma rays after the gamma rays have been reflected by the formation (not shown) and/or the mud 61. In a third embodiment, the source produces acoustic waves, and the detector 508 detects the returning acoustic waves after the acoustic waves have been reflected by the formation (not shown) and/or the mud 61. In a fourth embodiment, the source produces neutrons, and the detector 508 detects the returning gamma rays after the neutrons excite the formation (not shown) and/or the mud 61 to produce gamma rays. In another embodiment, the tool 100 may be rotated to measure properties in one or more other sectors.

Figure 6B:
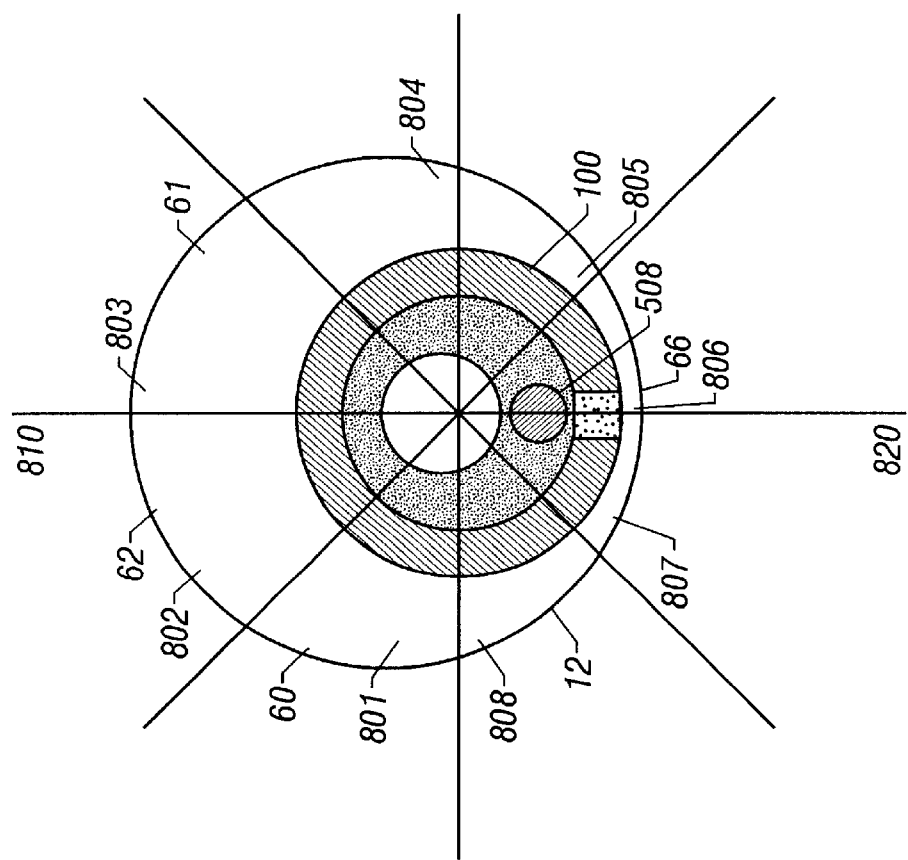
FIG. 6B illustrates a sectional view of a tool in a borehole with the detector pointing into the mud.

FIG. 6B represents another embodiment of the invention where the tool 100 is in a borehole 12, near the bottom side 66 of the borehole 12, and/or off-center in the borehole. Typically, the tool 100 will migrate towards the bottom side 66 due to gravity (in a deviated borehole). The annulus 60 is the mud crescent 62 or the crescent-shaped area of the borehole 12 that is not occupied by the tool 100. The annulus 60 of the borehole 12 is occupied by the mud 61. In one embodiment, the detector 508 is a thermal neutron detector, and in another embodiment, the detector 508 is an epithermal neutron detector. The borehole is divided into two sectors, a top sector 810 and a bottom sector 820. The top sector 810 has been subdivided into four subsectors 801, 802, 803, and 804. The bottom sector 820 has been subdivided into four subsectors 805, 806, 807, and 808. In this embodiment, the detector 508 mostly detects the mud properties since the detector is in the top sector 810. In a first embodiment, the source produces neutrons, and the detector 508 detects the returning neutrons after the neutrons have been reflected by the formation (not shown) and/or the mud 61. In a second embodiment, the source (not shown) produces gamma rays, and the detector 508 detects the returning gamma rays after the gamma rays have interacted with the formation (not shown) and/or the mud 61. In a third embodiment, the source produces acoustic waves, and the detector 508 detects the returning acoustic waves after the acoustic waves have been reflected by the formation (not shown) and/or the mud 61. In a fourth embodiment, the source produces neutrons, and the detector 508 detects the returning gamma rays after the neutrons excite the formation (not shown) and/or the mud 61 to produce gamma rays. In another embodiment, the tool 100 may be rotated to measure properties in one or more additional sectors.

Figure 7:
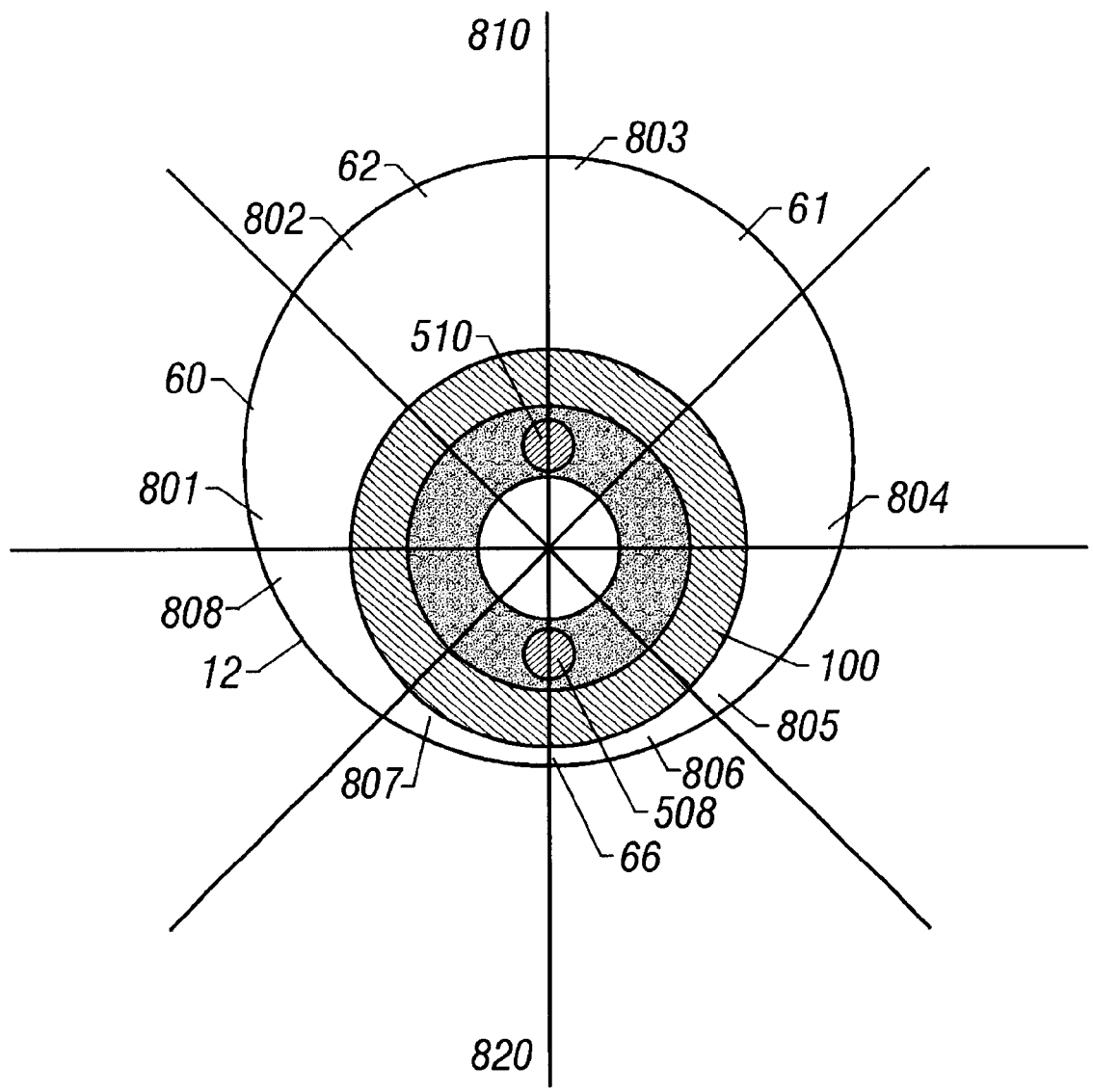
FIG. 7 illustrates a sectional view of a tool in a borehole with one detector pointing into the mud, and another detector pointing into the formation.

FIG. 7 represents another embodiment of the invention where the tool 100 is in a borehole 12, near the bottom side 66 of the borehole 12, and/or off-center in the borehole. Typically, the tool 100 will migrate towards the bottom side 66 due to gravity (in a deviated borehole), as in the previous embodiments. The annulus 60 is the mud crescent 62 or the crescent-shaped area of the borehole 12 that is not occupied by the tool 100. The annulus 60 of the borehole 12 is occupied by the mud 61. In this embodiment, the tool 100 has a source (not shown), a first detector 508 on one side of the tool, and a second detector 510 on another side of the tool. In one embodiment, the first detector 508 and/or the second detector 510 are thermal neutron detectors, and in another embodiment, the first detector 508 and/or the second detector 510 are epithermal neutron detectors. The borehole is divided into two sectors, a top sector 810 and a bottom sector 820. The top sector 810 has been subdivided into four subsectors 801, 802, 803, and 804. The bottom sector 820 has been subdivided into four subsectors 805, 806, 807, and 808. In this embodiment, the first detector 508 mostly detects the formation properties since the first detector 508 is in the bottom sector 820, and the second detector 510 mostly detects the mud properties since the second detector 510 is in the top sector 810. In a first embodiment, the source produces neutrons, and the detectors 508, 510 detect the returning neutrons after the neutrons have been reflected by the formation (not shown) and/or the mud 61. In a second embodiment, the source 506 produces gamma rays, and the detectors 508, 510 detect the returning gamma rays after the gamma rays have interacted with the formation (not shown) and/or the mud 61. In a third embodiment, the source produces acoustic waves, and the detectors 508, 510 detect the returning acoustic waves after the acoustic waves have been reflected by the formation (not shown) and/or the mud 61. In a fourth embodiment, the source produces neutrons, and the detectors 508, 510 detect the returning gamma rays after the neutrons excite the formation (not shown) and/or the mud 61 to produce gamma rays. In another embodiment, the tool 100 need not be rotated to measure properties in two sectors. In another embodiment, the tool 100 may be rotated to measure properties in two or more additional sectors.

In one embodiment, data from any or all of the sectors can be processed using a spine and ribs technique for the density measurement and a standard near/far ratio technique can be used to compute a neutron porosity. Alternative embodiments include, a borehole invariant porosity (BIP) technique for the neutron measurement and a simple inversion technique for the density. The BIP technique is disclosed in U.S. Pat. No. 5,767,510, issued to Evans. Techniques for performing an inversion are well known in the art; see, for example, H. Chapellat and L. Jammes, "Logging Method and Apparatus Using a Pad to Measure Density", U.S. Pat. No. 5,528,029, Jun. 18, 1996; and F. Allioli, O. Faivre, L. Jammes, and M. Evans, "A New Approach to Computing Formation Density and Pe Free of Mudcake Effects", SPWLA 38$^{th}$ Annual Logging Symposium Transactions, paper K, pp. 1–14 (1997). These or similar techniques could also be used for other measurements such as: photoelectric factor, hydrogen index, sigma, and salinity of the formation; photoelectric factor, hydrogen index, sigma, and salinity of the mud; tool standoff; and borehole diameter.

In one embodiment, all of the sensor signals may be stored in mass memory devices of a computer (not illustrated) for review and possible further analysis and interpretation when the bottom hole drilling assembly is returned to the surface. Certain data, limited in amount due to bandwidth limitations, may be transmitted to surface instrumentation via the drill string mud path from communications sub 400, or by a cable or other suitable means. In another embodiment, the data resulting from the tool's measurements may be stored for post-processing instead of being transmitted back uphole. In another embodiment, the data might be processed downhole.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a characteristic of a mud mixture surrounding a drilling tool within a borehole in which a drilling tool is received, comprising:

turning said tool in said borehole;

applying energy into said borehole from an energy source disposed in said tool;

recording measurement signals received at a sensor disposed in said tool from a location around said borehole, the sensor being located near the energy source such that a received measurement signal relates to interaction between the applied energy with predominantly the mud mixture or interaction between the applied energy with the mud mixture and a formation area just the borehole;

separating a cross-section of the borehole substantially perpendicular to a longitudinal axis of the borehole into at least a first sector and a second sector, wherein a first measurement signal from said first sector is substantially in response to returning energy which results from the interaction of the applied energy with said mud mixture; and a second measurement signal from said second sector is substantially in response to returning energy which results from the interaction of the applied energy with said formation; and deriving an indication of an intrinsic characteristic of said mud mixture from said first measurement signal associated with the first sector of said borehole.

2. The method of claim 1, wherein an indication of a characteristic of said mud mixture is derived for at least two of said sectors.

3. The method of claim 1, wherein said intrinsic characteristic is selected from the group consisting of density, hydrogen index, salinity, sigma, neutron slowing down length, neutron slowing down time, compositional information from neutron induced gamma ray spectroscopy, and photoelectric effect.

4. The method of claim 1 wherein said energy applied into said borehole comprises gamma rays, and said returning energy comprises gamma rays which result from interaction with said mud mixture.

5. The method of claim 1 wherein said energy applied into said borehole comprises neutrons, and said returning energy comprises radiation which results from interaction or said neutrons with said mud mixture.

6. The method of claim 1 wherein at least one neutron gamma process is used to derive the indication of the intrinsic characteristic of said mud mixture.

7. The method of claim 1 wherein said second sector includes a point defined by intersection of earth's gravity vector with said cross section.

8. The method of claim 1 wherein the first sector includes a point opposite in the wellbore to a point defined by intersection of earth's gravity vector with said cross section.

9. The method of claim 1 wherein said energy applied into said borehole comprises ultrasonic pulses, and said returning energy comprises ultrasonic pulses which interact with said mud mixture.

10. The method of claim 1 wherein said energy applied into said borehole comprises gamma rays, and said returning energy comprises gamma rays which result from interaction with said mud mixture, the method further comprising, recording the identity of each one of the sectors that said sensor is in while said tool is turning in said borehole, and recording the number of gamma ray counts in a plurality of energy windows of said sensor occurring in each one of the sectors.

11. The method of claim 10 wherein said sensor comprises short and long spaced gamma ray detectors spaced from an energy source which emits gamma rays, and further comprising, recording the number of gamma ray counts of said short spaced gamma ray detector per sector, and recording the number of gamma ray counts of said long spaced gamma ray detector per sector.

12. The method of claim 11 wherein said intrinsic characteristic is selected from the group consisting of density and photoelectric effect.

13. A method for determining density of a mud mixture within a borehole in which a drilling tool is received, comprising:

defining a bottom angular sector of said borehole;

defining at least one more angular sector of said borehole;

applying gamma rays into said mud mixture from a radiation source;

recording, with respect to an angular position of said tool with respect to the borehole a count rate of gamma rays which return to a sensor disposed on the tool near the radiation source such that the count rate results from interaction between the gamma rays predominantly with said mud mixture or interaction between the gamma rays with the mud mixture and a formation area just beyond the borehole;

determining at least a density of the mud mixture from the count rate of gamma rays for the at least one more of the sectors.

14. The method of claim 13 further comprising, defining other angular sectors of said tool about said borehole, and determining the density of the mud mixture for a plurality of said angular sectors from the gamma ray count rates which occur solely within each of said angular sectors about said borehole.

15. The method of claim 13 further comprising, determining the density of the mud mixture for each of said at least more of the sectors from the gamma ray count rates which occur solely within said angular sectors about said borehole.

16. The method of claim 13 wherein the gamma ray counts are recorded with respect to the energy levels thereof, the energy levels segregated into at least one hard window range wherein gamma rays detected arc related to density; and at least one soft window range wherein gamma rays detected are related to photoelectric effect.

17. A method for determining a photoelectric effect (PEP) of a mud mixture within a borehole in which a tool is received, said tool including a source of radiation and a gamma ray detector, the method comprising:

turning said tool in said borehole;

applying energy into said borehole from an energy source disposed in said tool;

recording measurement signals received at a sensor disposed in said tool from locations azimuthally distributed around said borehole, the sensor being located near the energy source such that a received measurement signal relates to interaction between applied energy with predominantly the mud mixture or interaction between the applied energy with the mud mixture and a formation area just beyond the borehole;

separating a cross-section of the borehole substantially perpendicular to a longitudinal axis of the borehole into at least a first sector and a second sector, wherein a first measurement signal from said first sector is substantially in response to returning energy which results from the interaction of the applied energy with said mud mixture; and a second measurement signal from said second sector is substantially in response to returning energy which results from the interaction of the applied energy with said formation;

determining a density ($\rho$), of the mud mixture, calculated from said first measurement signal;

determining a macroscopic cross section (U), of the mud mixture from said first measurement signal, and determining the PEF of said mud mixture as a ratio of said macroscopic cross section to said density, that is, PEF=U/$\rho$.

18. The method of claim 17, wherein an indication of the PEF of said mud mixture is derived for at least two of said sectors.

19. The method of claim 17, wherein said energy applied into said borehole comprises gamma rays, and said returning energy comprises gamma rays which result from interaction with said mud mixture.

20. The method of claim 17, wherein said energy applied into said borehole comprises neutrons, and said returning energy comprises radiation which results from interaction of said neutrons with said mud mixture.

21. The method of claim 17, wherein at least one neutron gamma process is used to derive the indication of the PEF of said mud mixture.

22. The method of claim 17, wherein said second sector includes a point defined by intersection of earth's gravity vector with said cross section.

23. The method of claim 17, wherein said energy applied into said borehole comprises gamma rays, and said returning energy comprises gamma rays which result from interaction with said mud mixture, the method further comprising, recording the identity of each one of the sectors that said sensor is in while said tool is turning in said borehole, and recording the number of gamma ray counts in a plurality of energy windows of said sensor occurring in each one of the sectors.

24. The method of claim 23 wherein said sensor comprises short and long spaced gamma ray detectors spaced from an energy source which emits gamma rays, and further comprising, recording the number of gamma ray counts of said short spaced gamma ray detector per sector, and recording the number of gamma ray counts of said long spaced gamma ray detector per sector.

25. A method for determining hydrogen index of a mud mixture surrounding a drilling tool within a borehole in which said drilling tool is received, comprising;

defining a bottom angular sector of said borehole;

defining at least one more angular sector of said borehole;

applying neutrons into said mud mixture from a radiation source;

recording, with respect to an angular position of said tool with respect to the borehole a count rate of neutrons which return to a sensor disposed on the tool near the radiation source such that the count rate results from interaction between the neutrons predominantly with said mud mixture or interaction between the neutrons with the mud mixture and a formation area just beyond the borehole; and determining at least a hydrogen index of the mud mixture from the count rate of neutrons for the at least one more of the angular sectors of said borehole.

26. The method of claim 25, further comprising defining a plurality of additional angular sectors around the borehole, and wherein an indication of the hydrogen index of said mud mixture is derived for at least one of said plurality of additional sectors.

27. The method of claim 25, wherein said energy applied into said borehole comprises neutrons, and said returning energy comprises gamma radiation which results from interaction of said neutrons with said mud mixture.

28. A method for determining salinity of a mud mixture within a borehole in which a drilling tool is received, comprising:

defining a bottom angular sector of said borehole;

defining at least one more angular sector of said borehole;

applying neutrons into said mud mixture from a radiation source;

recording, with respect to an angular position of said tool with respect to the borehole a count rate of neutrons which return to a sensor disposed on the tool near the radiation source such that the count rate results from interaction between the neutrons predominantly with said mud mixture or interaction between the neutrons with the mud mixture and a formation area beyond the borehole;

determining at least a salinity of the mud mixture from the count rate of neutrons for the at least one or more of the sectors of said borehole.

29. The method of claim 28, further comprising defining a plurality of additional angular sectors around the borehole and wherein an indication of the salinity of said mud mixture is derived for at least one of said additional sectors.

30. The method of claim 28, wherein said energy applied into said borehole comprises neutrons, and said returning energy comprises radiation which results from interaction of said neutrons with said mud mixture.

31. A method for determining a characteristic of a mud mixture surrounding a drilling tool within a borehole in which a drilling tool is received, comprising:

defining a cross-section of said borehole which is orthogonal to a longitudinal axis of said tool;

applying energy into said borehole from an energy source disposed in said tool;

recording measurement signals received at a plurality of azimuthally distributed sensors disposed in said tool from a plurality of locations around said borehole, the sensors being located near the energy source such that a received measurement signal relates to interaction between the applied energy with predominantly the mud mixture or interaction between the applied energy with the mud mixture and a formation area just beyond the borehole;

separating said cross-section into at least a first sector and a second sector, wherein a first measurement signal from ones of said sensors disposed in said first sector is substantially in response to returning energy which results from the interaction of the applied energy with said mud mixture; and a second measurement signal from ones of said sensors disposed in said second sector is substantially in response to returning energy which results from the interaction of the applied energy with said formation; and deriving an indication of an intrinsic characteristic of said mud mixture from said first measurement signals associated with the first sector of said borehole.

32. The method of claim 31 further comprising defining a plurality of additional angular sectors around the borehole and wherein an indication of a characteristic of said mud mixture is derived for at least one of said additional sectors.

33. The method of claim 31, wherein said intrinsic characteristic is selected from the group consisting of density, hydrogen index, salinity, sigma, neutron slowing down length, neutron slowing down time, compositional information from neutron induced gamma ray spectroscopy, and photoelectric effect.

34. The method of claim 31 wherein said energy applied into said borehole comprises gamma rays, and said returning energy comprises gamma rays which result from interaction with said mud mixture.

35. The method of claim 31 wherein said energy applied into said borehole comprises neutrons, and said returning energy comprises radiation which results from interaction of said neutrons with said mud mixture.

36. The method of claim 31 wherein at least one neutron gamma process is used to derive the indication of the intrinsic characteristic of said mud mixture.

37. The method of claim 31 wherein said second sector includes a point defined by intersection of earth's gravity vector with said cross section.

38. The method of claim 31 wherein said energy applied into said borehole comprises ultrasonic pulses, and said returning energy comprises ultrasonic pulses which interact with said mud mixture.

39. The method of claim 31 wherein said energy applied into said borehole comprises gamma rays, and said returning energy comprises gamma rays which result from interaction with said mud mixture, the method further comprising, recording an identity of each one of the sectors that ones of said sensors are in while said tool is turning in said borehole, and recording a number of gamma ray counts in a plurality of energy windows for gamma rays detected by each of said sensors occurring in each one of the sectors.

40. The method of claim 39 wherein said sensors comprise short and long spaced gamma ray detectors axially spaced from an energy source which emits gamma rays, and further comprising, recording a number of gamma ray counts of said short spaced gamma ray detector per sector, and recording a number of gamma ray counts of said long spaced gamma ray detector per sector.

41. The method of claim 40 wherein said intrinsic characteristic is selected from the group consisting of density and photoelectric effect.

* * * * *

UNITED STATES PATENT AND TRADEMARK OFFICE
CERTIFICATE OF CORRECTION

PATENT NO. : 6,648,083 B2  
DATED : November 18, 2003  
INVENTOR(S) : Evans et al.

It is certified that error appears in the above-identified patent and that said Letters Patent is hereby corrected as shown below:

Column 14,  
Line 23, after "formation area just", insert -- beyond --.

Column 15,  
Line 55, "(PEP)" should read -- (PEF) --.

Signed and Sealed this

Second Day of March, 2004

JON W. DUDAS  
*Acting Director of the United States Patent and Trademark Office*